May 7, 1935.  C. E. SNYDER  2,000,260
VINE DIVIDER
Filed Sept. 15, 1934  3 Sheets-Sheet 1

Inventor
Charles E. Snyder
By Clarence A. O'Brien
Attorney

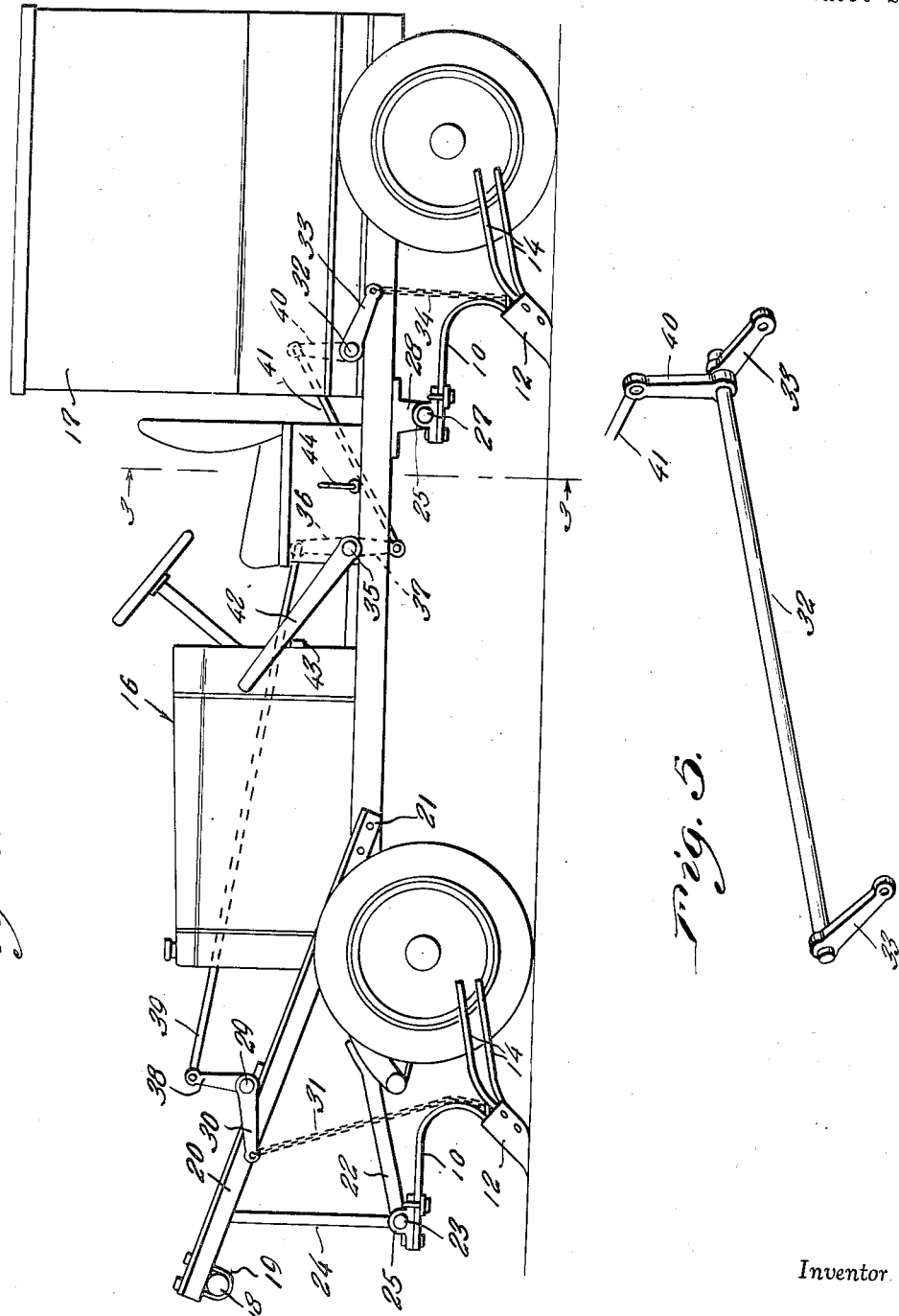

May 7, 1935.  C. E. SNYDER  2,000,260
VINE DIVIDER
Filed Sept. 15, 1934  3 Sheets-Sheet 3
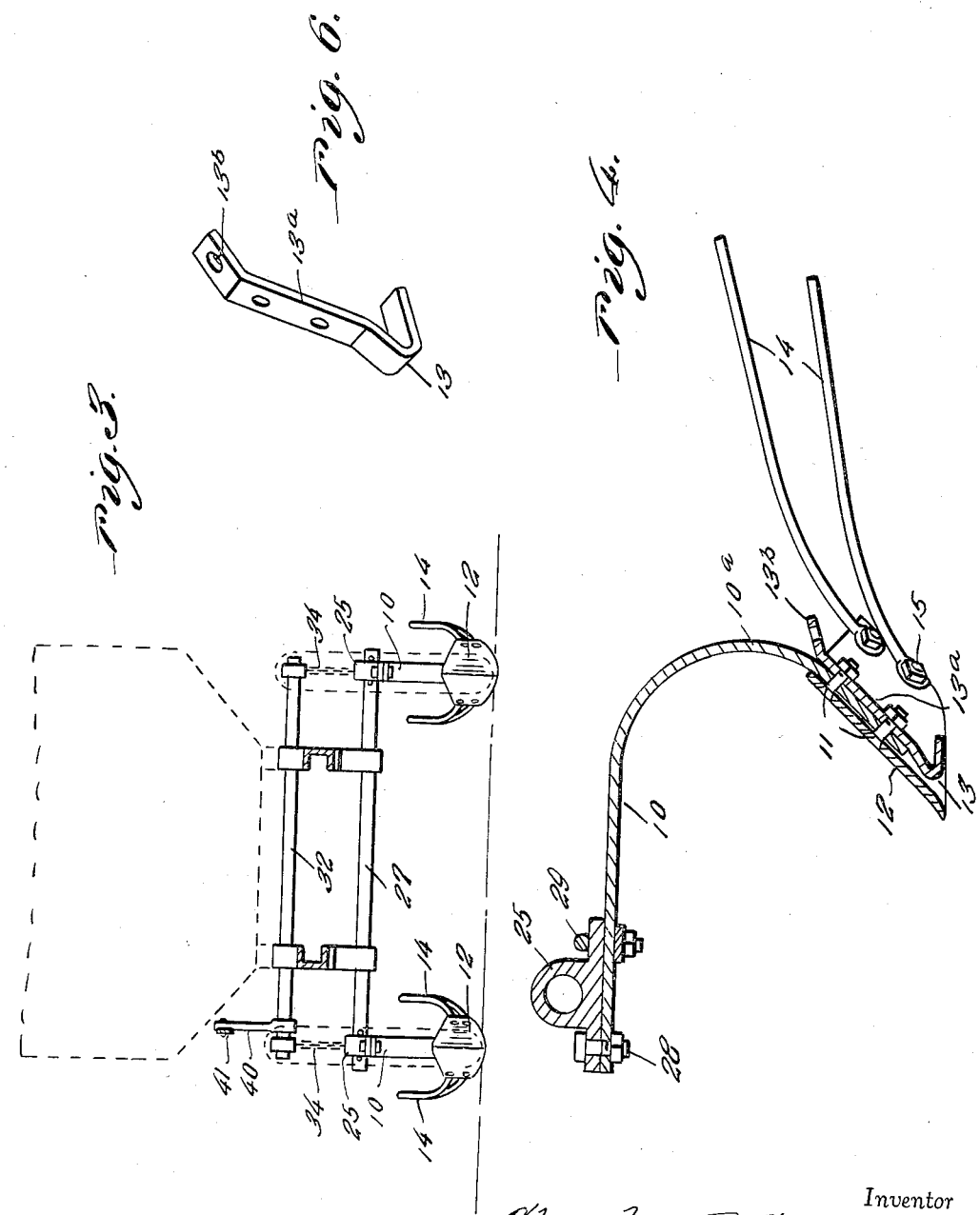
Inventor
Charles E. Snyder
By Clarence A. O'Brien
Attorney Patented May 7, 1935

2,000,260

UNITED STATES PATENT OFFICE 2,000,260

VINE DIVIDER

Charles E. Snyder, Jordan, Pa.

Application September 15, 1934, Serial No. 744,202

3 Claims. (Cl. 97—192)

This invention relates to an attachment for use on agricultural implements, and is particularly adapted for dividing the vines in front of the wheels of the implement so as to protect the vines from injury by the wheels.

The divider in accordance with the present invention is adapted to be used with a motor driven vehicle and more particularly with a motor driven spraying device.

An object of the invention is to provide a divider which may be so mounted on the vehicle as to permit a ready lifting and lowering of the divider, with the front divider so arranged relative to the front wheels that when lifted they will offer no interference to a proper turning of the wheels in the guiding of the vehicle.

A still further object of the invention is to provide improved means for suspending the dividers in operative position so that the same will readily yield upon coming into contact with an abutment such as a stone or the like and thereby prevent breakage.

The invention, together with its objects and advantages, will be best understood from a study of the following description taken in connection with the accompanying drawings wherein:

Figure 2 is a side elevational view with the invention shown applied.

Figure 3 is a detail view taken substantially on the line 3—3 of Figure 2.

Figure 4 is a sectional view through one of the dividers.

Figure 5 is a perspective view of the rear rock shaft.

Figure 6 is a perspective view of a ground bearing shoe.

Figure 1:
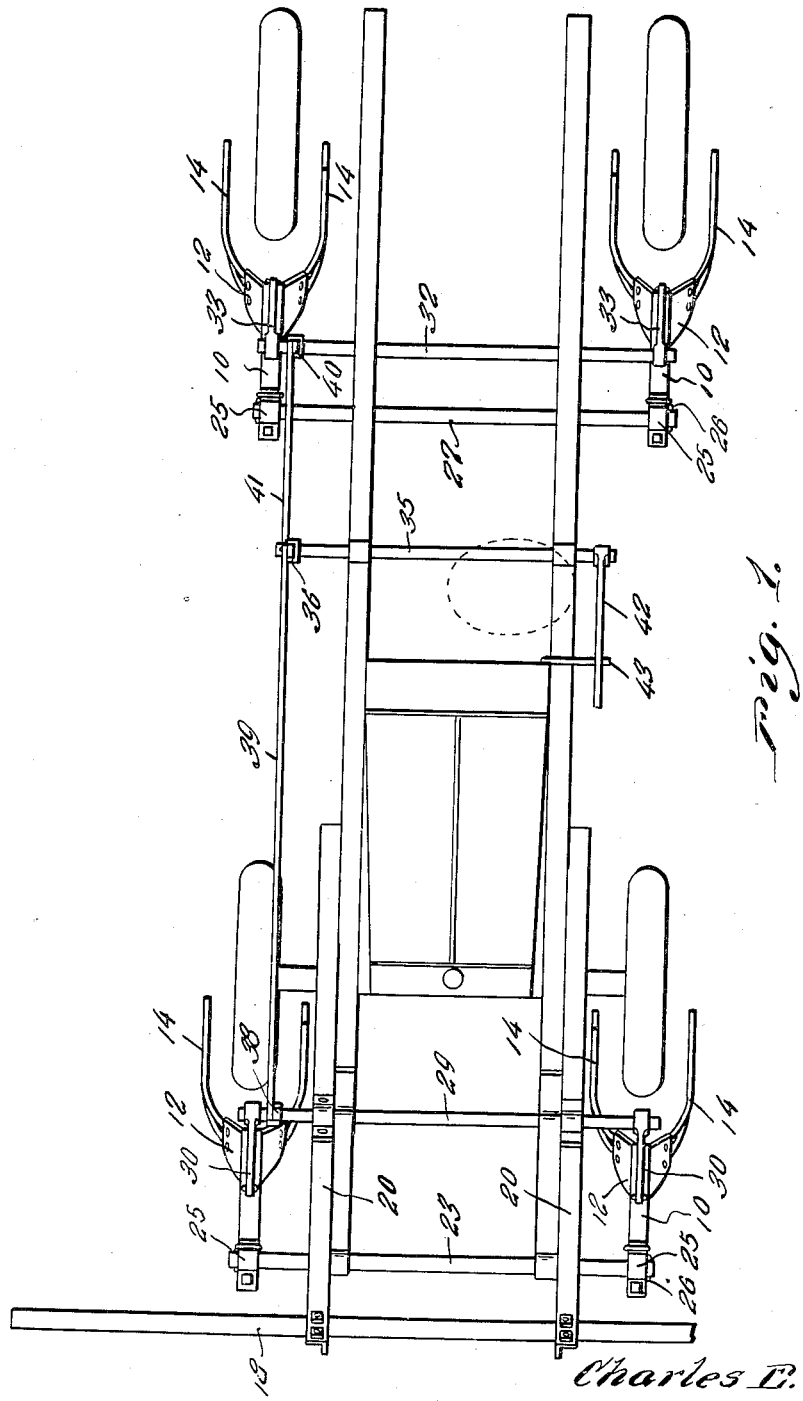
Figure 1 is a top plan view illustrating the application of the invention.

Referring to the drawings by reference numerals and more particularly to Figures 3, 4, and 6, it will be seen that each vine divider comprises a shank member 10 that is formed of flat spring metal of suitable strength and durability and of suitable length. The shank 10 has a curved end 10a to which is secured by bolts 11 spreader member 12 at one side of the shank and a ground bearing shoe 13 at the opposite or rear side of the shank. The spreader 12 is substantially wedge shaped and is arranged to slope downwardly and forwardly, as shown, terminating at the front end with a point. To opposite sides of the spreader 12 and extending upwardly and rearwardly from the inner faces of said sides of the spreader are pairs of fingers 14 secured to the spreader 12 by bolt and nut means 15.

The ground bearing shoe 13 is formed from strap metal to provide a shank 13a that is apertured to accommodate the bolts 11 and at its lower end the shank 13a is offset forwardly and then bent reversely to provide the ground bearing shoe, proper, 13 and which is located directly behind the point of the spreader 12 to engage the ground in a manner to prevent the point of the spreader digging into the ground to an undesirable depth.

In the present instance, the vine dividers are shown as when used on a motor driven vehicle equipped for spraying purposes, the vehicle being designated generally by the reference numeral 16. In the present instance the wagon or truck body and fenders, as well as the running boards have been removed and the vehicle equipped with a tank 17 adapted to contain a solution sprayed onto the vine and which through the medium of suitable piping is connected with a spray pipe 18 that is secured as at 19 to the upper ends of forwardly and upwardly extending angle bars 20 secured to the chassis of the truck as at 21.

In applying the invention to the vehicle so equipped, there are provided forwardly extending braces 22 which, at their forward ends, are equipped with bearings in which are secured the ends of a shaft or rod 23, suitable braces 24 being provided for the bearing braces 22. Pivotally connected with the shafts 23 adjacent the ends thereof are front vine dividers of the type shown in Figure 4 and herein described in detail, the shanks of which dividers are equipped with bearing collars 25 that engage the shaft 23 and rotate thereabout as an axis, cotter pins 26 being provided to prevent the collars 25 from slipping off the ends of the shafts. The collars 25 are secured to the shanks 10 through the medium of bolts 28 and also U-bolts 29.

Arranged in operative position to the rear wheel of the vehicle are additional dividers, the collars 25 of which are engaged with a rod or shaft 27 supported by brackets 28 depending from the frame of the truck, the ends of the shaft 27 being also provided with cotter pins similar to the aforementioned cotter pins 26.

For raising and lowering the dividers, there is provided a rock shaft 29 journaled in suitable bearings provided on the angle bars 20 and equipped with crank arms 30 which are connected through the medium of chains or other flexible elements 31 to the front dividers, the chains 31 being suitably engaged with the apertured offset ends 13b of the shoe shanks 13a.

A second rock shaft 32 is suitably journaled in bearings provided adjacent the rear end of the vehicle, and the shaft 32 is also provided with crank arms 33 which are connected through the medium of chains 34 corresponding to the chains 31, with the rear vine dividers.

An operating shaft 35 extends transversely of the vehicle in proximity to the driver's seat and is suitably journaled in bearings provided on the frame of the vehicle. The shaft 35 is provided with oppositely extending crank arms 36 and 37 of which crank arm 36 is connected to a crank arm 38 on the shaft 29 by a link 39, and the crank arm 37 is connected with a crank arm 40 on the shaft 32 through the medium of a link 41. An operating lever for the shaft 35 is indicated by the reference numeral 42 and is arranged at one side of the vehicle in convenient reach to the operator. When the vine dividers are in the lowered operating position, which is the position shown in Figure 2 of the drawings, the lever 42 is in the forward position and engages a stop bracket 43 provided to limit the rotative movement of the vehicle.

Obviously, to raise the dividers the lever 42 is pulled to rotate the shaft 35 in a clockwise direction and the dividers are held in the raised or elevated position by engaging the lever 42 with a suitable hook 44 provided as shown in Figure 2.

It will be understood that when the dividers are in elevated position, the fingers 14 of the front dividers will be disposed wholly forwardly with respect to the front wheels so as not to interfere with the turning of the wheels in either direction and thus permit the operator to change the course of travel either to the left or right.

With the dividers in lowered operative position, the fingers 14 are disposed at opposite sides of the wheel, and the spreaders 12 with the associated fingers 14 and shoes 13 will travel along in front of each wheel of the vehicle and thus the vines will be divided so that the wheels will not pass over the vines and injure the same. Also, as before mentioned, the ground engaging shoes 13 will prevent the spreaders 12 from digging too deeply into loose soil and will also ride over stones and other obstructions in such a manner as to prevent breakage to the dividers.

What is claimed is:

1. The combination with a motor driven vehicle having steering wheels, vine dividers mounted forwardly of said steering wheels, means pivotally supporting the vine dividers from the vehicle, each vine divider including a forwardly disposed spreader member and a rearwardly disposed ground bearing shoe, means connected with the vine dividers for raising and lowering them, and said means including means for releasably securing the vine dividers in elevated position and free of the steering wheels to permit the turning of the latter in either direction for changing the path of travel of the vehicle either to the right or to the left.

2. The combination with a motor driven vehicle having steering wheels, of vine dividing means pivotally suspended from the vehicle for moving vines growing close to the ground out of the paths of said steering wheels, each of said vine dividers including a forwardly disposed spreader member, a ground bearing shoe disposed immediately rearwardly of the spreader members, and fingers extending upwardly and rearwardly from the spreader members for disposition at opposite sides of the proximate steering wheel when the dividers are in lowered position, and means connected with the dividers for raising and lowering the dividers, said dividers being movable through an arc sufficient to move the fingers clear of the steering wheels to thereby permit turning movement of the steering wheels laterally either to the right or to the left.

3. The combination with an agricultural implement having driving wheels and steering wheels, transversely disposed forward and rear shafts fixedly mounted on the vehicle, vine divider means pivotally engaged with the shafts and having ground engaging members and fingers extending rearwardly from the members and flanking the inner and outer sides of the driving and steering wheels, forward and rearward rock shafts mounted on the vehicle, flexible operating connections between said rock shafts and the vine dividers for transmitting movement of the rock shafts to the dividers, operating means connected with the rock shafts to actuate them to raise and lower said dividers, said operating means including an operating lever, and means engageable with the lever for securing the same in set position to thereby hold the dividers in elevated position with the fingers of the front dividers clear of the steering wheels.

CHARLES E. SNYDER.